(12) United States Patent
Padaki et al.

(10) Patent No.: US 8,654,873 B2
(45) Date of Patent: Feb. 18, 2014

(54) METHOD TO INVOKE CHANNEL DECODER EARLY TO DECREASE THE ACQUISITION TIME IN DEMODULATORS

(76) Inventors: Gururaj Padaki, Bangalore (IN); Sunil Hosur Rames, Bangalore (IN); Rakesh A Joshi, Bangalore (IN); Raghavendra Raichur, Bangalore (IN); Rajendra Hegde, Bangalore (IN)

( * ) Notice: Subject to any disclaimer, the term of this patent is extended or adjusted under 35 U.S.C. 154(b) by 123 days.

(21) Appl. No.: 13/436,092

(22) Filed: Mar. 30, 2012

(65) Prior Publication Data
US 2012/0249889 A1 Oct. 4, 2012

(30) Foreign Application Priority Data
Mar. 31, 2011 (IN) ............................ 1086/CHE/2011

(51) Int. Cl.
*H04K 1/10* (2006.01)

(52) U.S. Cl.
USPC ........... 375/260; 375/262; 375/265; 375/349; 714/795; 714/794; 714/786; 714/784; 714/775; 714/776; 714/789; 348/726; 348/465; 348/507; 348/508; 348/729; 348/E5.113; 348/E17.002; 348/E5.003; 348/E5.01; 348/E5.017; 348/E5.114

(58) Field of Classification Search
USPC ............ 348/726, 465, 507, 508, 729, E4.113, 348/E17.002, E5.003, E5.01, E5.017, 348/E5.114; 375/260, 262, 265, 341, 349; 714/795, 794, 786, 784, 775, 776, 789; 260/260, 262, 265, 341, 349
See application file for complete search history.

(56) References Cited

U.S. PATENT DOCUMENTS 8,279,958 B2 * 10/2012 Okehie et al. ................. 375/260
2007/0140292 A1 * 6/2007 Sestok et al. .................. 370/465

* cited by examiner

*Primary Examiner* — Daniel Washburn
*Assistant Examiner* — Rahel Guarino
(74) *Attorney, Agent, or Firm* — The Law Office of Austin Bonderer

(57) ABSTRACT

In one embodiment, a Television (TV) receiver to perform a method of synchronizing a demodulator at a Viterbi decode input in the TV receiver using one or more bit de-interleaved even and odd Orthogonal Frequency Division Multiplexing (OFDM) symbols is provided. The method includes (i) performing a Viterbi decoding on the bit de-interleaved even and odd OFDM symbols when a frame boundary does not exist for the bit de-interleaved even and odd OFDM symbols, (ii) performing a convolutional encoding on an decoded data output of the Viterbi decoding, (iii) determining whether an output of the convolutional encoding of the bit de-interleaved OFDM symbols matches an input at a Viterbi decode, and (iv) determining whether the output of the convolutional encoding of the bit de-interleaved even and odd OFDM symbols matches with a SYNC pattern or a SYNC' pattern to obtain a RS packet align boundary.

9 Claims, 17 Drawing Sheets

| CODE RATES R | PUNCTURING PATTERN | TRANSMITTED SEQUENCE (AFTER PARALLEL-TO-SERIAL CONVERSION) |
| --- | --- | --- |
| 1/2 | X: 1<br>Y: 1 | $X_1 Y_1$ |
| 2/3 | X: 10<br>Y: 11 | $X_1 Y_1 Y_2$ |
| 3/4 | X: 101<br>Y: 110 | $X_1 Y_1 Y_2 X_3$ |
| 5/6 | X: 10101<br>Y: 11010 | $X_1 Y_1 Y_2 X_3 Y_4 X_5$ |
| 7/8 | X: 1000101<br>Y: 1111010 | $X_1 Y_1 Y_2 X_3 Y_4 X_5 Y_6 X_7$ |

FIG. 2D (PRIOR ART)

| | CONDITIONS AT SUPERFRAME(SF) BOUNDARY | |
|---|---|---|
| | MODULE | CONDITION |
| 1 | VITERBI ENCODE/DECODE | MSB OF SYNC OR SYNC' AS INPUT |
| 2 | SYMBOL INTERLEAVER/ DEINTERLEAVER | EVEN SYMBOL |
| 3 | RANDOMIZER/DERANDOMIZER | POLYNOMIAL RESETS FOR EVERY 8 TS PACKETS(RESET ON SYNC') |

FIG. 4

| Mode | 8K | Gaurared Interval | 1 by 4 | | | | | |
|---|---|---|---|---|---|---|---|---|
| Time/symbol(msec) | 1.120 | Time/Frame (ms) | 76.16 | | | | | |
| No of Data Carriers | 6048 | Time/Super Frame (ms) | 304.64 | | | Code Rate | | |
| Mapping | Bits/Sample | Bits/Symbol | Symbols/Frame | | | Bits/Frame (Viterbi Output) | | |
| | | | | 1 by 2 | 2 by 3 | 3 by 4 | 5 by 6 | 7 by 8 |
| QPSK | 2 | 12096 | 68 | 411264 | 548352 | 616896 | 685440 | 719712 |
| 16QAM | 4 | 24192 | 68 | 822528 | 1096704 | 1233792 | 1370880 | 1439424 |
| 64QAM | 6 | 36288 | 68 | 1233792 | 164505 | 1850688 | 2056320 | 2159136 |
| | | | | No of RS Packets / Frame | | | | |
| QPSK | | | | 252 | 336 | 378 | 420 | 441 |
| 16QAM | | | | 504 | 672 | 756 | 840 | 882 |
| 64QAM | | | | 756 | 1008 | 1134 | 1260 | 1323 |

FIG. 6B

| | No of Bits Flush at Veterbi input to sync at SYNC/SYNC | | | | | | | | | | | | | | |
|---|---|---|---|---|---|---|---|---|---|---|---|---|---|---|---|
| | MODE:2K | | | | | | | Code Rate | MODE:8K | | | | | | |
| | QPSK | | | | | | | | QPSK | | | | | | |
| Frame No | 1 by 2 | 2 by 3 | 3 by 4 | 5 by 6 | 7 by 8 | | | | 1 by 2 | 2 by 3 | 3 by 4 | 5 by 6 | 7 by 8 | | |
| 0 | 0 | 0 | 0 | 0 | 0 | | | | 0 | 0 | 0 | 0 | 0 | | |
| 1 | 0 | 0 | 816 | 0 | 1224 | | | | 0 | 0 | 0 | 0 | 0 | | |
| 2 | 0 | 0 | 0 | 0 | 816 | | | | 0 | 0 | 0 | 0 | 0 | | |
| 3 | 0 | 0 | 816 | 0 | 408 | | | | 0 | 0 | 0 | 0 | 0 | | |
| | 16QAM | | | | | | | | 16QAM | | | | | | |
| 0 | 0 | 0 | 0 | 0 | 0 | | | | 0 | 0 | 0 | 0 | 0 | | |
| 1 | 0 | 0 | 0 | 0 | 816 | | | | 0 | 0 | 0 | 0 | 0 | | |
| 2 | 0 | 0 | 0 | 0 | 0 | | | | 0 | 0 | 0 | 0 | 0 | | |
| 3 | 0 | 0 | 0 | 0 | 816 | | | | 0 | 0 | 0 | 0 | 0 | | |
| | 64QAM | | | | | | | | 64QAM | | | | | | |
| 0 | 0 | 0 | 0 | 0 | 0 | | | | 0 | 0 | 0 | 0 | 0 | | |
| 1 | 0 | 0 | 816 | 0 | 408 | | | | 0 | 0 | 0 | 0 | 0 | | |
| 2 | 0 | 0 | 0 | 0 | 816 | | | | 0 | 0 | 0 | 0 | 0 | | |
| 3 | 0 | 0 | 816 | 0 | 1224 | | | | 0 | 0 | 0 | 0 | 0 | | |

FIG. 7

METHOD TO INVOKE CHANNEL DECODER EARLY TO DECREASE THE ACQUISITION TIME IN DEMODULATORS

BACKGROUND

1. Technical Field

The present embodiment generally relates to a method of initiating channel decode in demodulators of a television system and, more particularly, relates to a method to invoke channel decoder early to decrease acquisition time in demodulators using synchronisation boundaries.

2. Description of the Related Art

Digital Video Broadcasting-Terrestrial/Handheld (DVB-T/H) digital demodulation system, a channel decoder includes Viterbi Decoding, followed by Reed Solomon decoder (RS-Decoder) and De-randomisation. To initiate Viterbi decode and RS-Decode initial state setups are required. Start of a channel super frame is the synchronisation boundary for the channel decoder. The initial conditions for Viterbi decode, RS and de-randomization is satisfied at this boundary. Super frame constitutes 4 frames. In DVB-T 8K mode, ¼ Guard Interval, super-frame boundary interval is 304 ms while it 76 ms for 2K mode, ¼ Guard interval. A search for this synchronisation boundary adds to overall channel change times.

Currently, channel decoders are synchronised based on super-frame boundary of an OFDM signal data. FIG. 1A illustrates a generic DTV system. It includes a RF tuner 102, a Demodulator 104, a media processor 106 and a display 108 with speakers 110. The RF tuner 102 tunes to a programmed RF frequency and outputs required frequency spectrum at a lower or standard Intermediate Frequency (IF) signal. The demodulator 104 receives the low IF or the standard IF data/signal and demodulates the IF signal and outputs a Transport Stream (TS). The Media processor 106 decodes the TS data and outputs video and audio to the display 108 with the speakers 110.

With reference to FIG. 1A, FIG. 1B is a flowchart illustrating a method of synchronising at a De-randomiser. In step 112, an RS decoder output 110 is subjected to detect SYNC'. If SYNC' is not detected, the RS decoder output sends a fresh output data for detecting SYNC' until SYNC' byte is obtained. After the SYNC' is detected by the RS decoder output in step 110, a pseudo-random binary sequence (PRBS) is initialised in step 114. The PRBS output initialises the Derandomiser in step 116.

FIG. 2A illustrates a block diagram of a typical DVB-T/H demodulator system. The block diagram includes a tuner 202, a signal conditioning and baseband conversion block 204, a mode and GI detection block 206, a Fast Fourier Transform (FFT), pilot and TPS processing block 208, a frequency/sampling time locking block 210, a channel estimation block 212, a demapper/symbol and deinterleaver block 214, a Viterbi decoder block 216, an outer deinterleaver block 218, and a RS decoder and derandomizer block 220. Any channel change (tuning to different frequency spectrum) requires settling timings for the tuner 102, the demodulator 104, and the media processor 106. These all timings will add up to the new channel video/audio rendering time which may be irritating for a viewer. In any receiver systems, before performing decoding/demodulation, systems need to be synchronised to a known point of a transmitted signal.

FIG. 2B illustrates a plurality of Scattered Pilots (SP) used for Even/Odd Symbol Detection. Reference information, taken from a reference sequence, is transmitted in Scattered Pilot cells in every symbol. Scattered Pilot cells are always transmitted at a "boosted" power level. Thus the corresponding modulation is given by:

$$Re\{c_{m,l,k}\}=(4/3)*2((½)-w_k)$$

$$Im\{c_{m,l,k}\}=0$$

Where m is the main frame index, k is the frequency index of the carriers and l is the time index of the symbols. For a symbol of index l (ranging from 0 to 67), carriers for which index k belongs to the subset $\{k-K_{min}+3*(l \bmod 4)+12p, p$ is an integer, $p>0, k \in [K_{min}: K_{max}]\}$ are scattered pilots. P is an integer that takes all possible values greater than or equal to zero, provided that the resulting value for k does not exceed a valid range $[K_{min}:K_{max}]$.

The purpose of the symbol interleaver 214 is to map 'v' bit words onto the 1512 (2K mode) or 6048 (8K mode) active carriers per OFDM symbol. The symbol interleaver 214 acts on blocks of 1512 (2K mode) or 6048 (8K mode) data symbols. Thus, in the 2K mode, 12 groups of 126 data words from the bit interleaver 214 are read sequentially into a vector $Y'=(y'_0, y'_1, y'_2, \ldots y'_{1\,511})$. Similarly in the 8K mode, a vector $Y'=(y'_0, y'_1, y'_2, \ldots y'_{6\,047})$ is assembled from 48 groups of 126 data words.

The interleaved vector $Y=(y_0, y_1, y_2, \ldots y_{Nmax-1})$ is defined by:

$$y_{H(q)}=y'_q \text{ for even symbols for } q=0, \ldots, N_{max}-1$$

$$y_q=y'_{H(q)} \text{ for odd symbols for } q=0, \ldots, N_{max}-1$$

Where $N_{max}=1\,512$ in the 2K mode and $N_{max}=6\,048$ in the 8K mode.

FIG. 2C illustrates a plurality of Reed Solomon Packets with SYNC/SYNC'. It includes four different packets viz: (i) a MPEG-2 transport MUX packet 222, (ii) Randomised transport packets 224, (iii) Reed Solomon RS (204, 188, 8) error protected packets 226 and (iv) a data structure after outer interleaving 228. The Randomised transport packets include SYNC bytes and randomised data bytes. The interleaving depth (I) in the data structure after outer interleaving 228 is 12 bytes. FIG. 2D is a table view illustrating a puncturing pattern and transmitted sequence after parallel-to-serial conversion for a plurality of possible code rates. The table view includes a code rate R field 230, a puncturing pattern field 232, a transmitted sequence field 234

FIG. 2E illustrates convolutional code of rate ½. Upon obtaining the transmitted sequence 234 after parallel-to-serial conversion as $X_1Y_1$, $X_1$ is received first by Viterbi Decoder input which starts at SYNC/SYNC'. SYNC implies TS sync byte 0x47 and SYNC' implies bit inverted TS sync byte 0XB8. At start of a super frame, MSB of SYNC/SYNC' lies at data input 236. The data input goes through series of 1-Bit delay processing with Modulo-2 addition 238 to produce X output ($G_1=171$ Octal) and Y output ($G_2=133$ Octal). The first convolutionally encoded bit of a symbol always corresponds to $X_1$ by default.

Thus, a channel decoder starts at a channel super frame level which takes time in searching and decoding and thereby increases channel scan/change timings. Accordingly, there remains a need to develop systems and method of efficient and timely invoking of channel decoder in order to reduce channel change/scan times.

SUMMARY

In view of the foregoing, an embodiment herein provides a television (TV) receiver to synchronize a demodulator in the receiver by performing a method of bit de-interleaving even OFDM symbols and odd OFDM symbols from one or more Orthogonal Frequency Division Multiplexing (OFDM) symbols using one or more channel modulation parameters, and effectively reducing channel change times in the TV receiver. The method includes (i) detecting even OFDM symbols and odd OFDM symbols from the one or more OFDM symbols, (ii) de-interleaving the even OFDM symbols and the odd OFDM symbols based on a positions of scattered pilots when a frame boundary does not exist for the one or more OFDM symbols, and bit de-interleaving the even OFDM symbols and the odd OFDM symbols.

The even OFDM symbols are de-interleaved based on an even position of the scattered pilots in the OFDM signals. The odd OFDM symbols are de-interleaved based on an odd position of the scattered pilots in the OFDM signals. The demodulator is synchronized at an OFDM symbol boundary when the channel modulation parameters are known. The channel modulation parameters include (i) a 2K mode or an 8K mode, (ii) a guard interval, (iii) a mapping type, (iv) a code rate of the OFDM symbols, and (v) positions of the scattered pilots. The channel change times is reduced by 1/n times of a super frame boundary for the OFDM symbol boundary. 'n' is number of OFDM symbols in the super frame boundary. The channel change times is reduced by 1/p times of the super frame boundary for the frame boundary. 'p' is number of frames in the super frame boundary.

In another aspect, a Television (TV) receiver to perform a method of synchronizing a demodulator at a Viterbi decode input in said TV receiver using one or more bit de-interleaved even and odd Orthogonal Frequency Division Multiplexing (OFDM) symbols, and decrease channel acquisition times in the demodulator based on one or more channel modulation parameters is provided. The method includes (i) performing Viterbi decoding on the bit de-interleaved even and odd OFDM symbols when a frame boundary does not exist for the bit de-interleaved even and odd OFDM symbols, (ii) performing a convolutional encoding on an decoded data output of the Viterbi decoding, (iii) determining whether an output of the convolutional encoding of the bit de-interleaved OFDM symbols matches an input at a Viterbi decode, and (iv) determining whether the output of the convolutional encoding of the bit de-interleaved even and odd OFDM symbols matches with a SYNC pattern or a SYNC' pattern to obtain a RS packet align boundary.

The method further includes (i) flushing a plurality of bits from the bit de-interleaved even and odd OFDM symbols when the output of the convolution encoding does not match the Viterbi decode input, and (ii) performing the Viterbi decoding on the bit de-interleaved even and odd OFDM symbols. The method further includes (i) flushing the bits from the bit de-interleaved even and odd OFDM symbols when the output of the convolutional encoding does not match the SYNC pattern or the SYNC' pattern, and (ii) performing the Viterbi decoding on the bit de-interleaved even and odd OFDM symbols.

The method further includes (i) flushing the bits from the bit de-interleaved even and odd OFDM symbols when the frame boundary exists for the bit de-interleaved even and odd OFDM symbols, and (ii) performing the Viterbi decoding on the bits to obtain a RS packet align boundary. The bits are flushed based on the channel modulation parameters, and a frame number of the frame boundary.

In yet another aspect, a method of synchronizing a demodulator at a de-randomizer in a television (TV) receiver for one or more Orthogonal Frequency Division Multiplexing (OFDM) symbols, and decreasing channel acquisition times in the demodulator based on channel modulation parameters is provided. The method includes (i) detecting even OFDM symbols and odd OFDM symbols from the one or more OFDM symbols, (ii) de-interleaving the even OFDM symbols and the odd OFDM symbols based on a positions of scattered pilots, (iii) bit de-interleaving the even OFDM symbols and the odd OFDM symbols, (iv) performing a Viterbi decoding on the bit de-interleaved even and odd OFDM symbols when a frame boundary does not exists for the bit de-interleaved even and odd OFDM symbols, (v) performing a convolutional encoding on an output of the Viterbi decoding, (vi) determining whether an output of the convolutional encoding matches an input of a Viterbi decode, and (vii) determining whether the output of the convolutional encoding of the bit de-interleaved OFDM symbols matches a SYNC pattern or a SYNC' pattern to obtain a RS packet align boundary.

The method further includes (i) rearranging and aligning data from the RS packet align boundary on a outer byte de-interleaver based on a match of the output of the convolutional encoding of the bit de-interleaved OFDM symbols with the SYNC pattern or the SYNC' pattern, and (ii) detecting the SYNC' pattern, and initializing a pseudo-random binary sequence (PRBS) to obtain a de-randomized TS packet. The data is rearranged and aligned for an error correction in a Reed Solomon (RS) decoder.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 2D is a table view illustrating a puncturing pattern and transmitted sequence after parallel-to-serial conversion for a plurality of possible code rates;

FIG. 4 is a table view illustrating one or more conditions at a super-frame boundary enforced by an encoder on a transmitter side according to an embodiment herein;

FIG. 6B is a table view illustrating a 8K Mode TS packets/Frame information according to an embodiment herein;

FIG. 7 is a table view illustrating a number of bits to flush at the Viterbi input to sync at SYNC/SYNC' in the 2K mode and the 8K Mode in various demodulation standards according to an embodiment herein;

DETAILED DESCRIPTION OF PREFERRED EMBODIMENTS

Figure 1A:
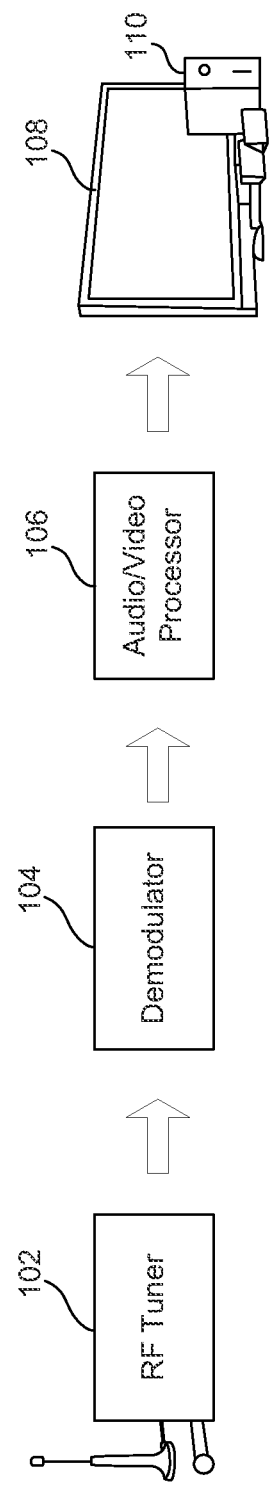
FIG. 1A illustrates a generic DTV system.
Figure 1B:
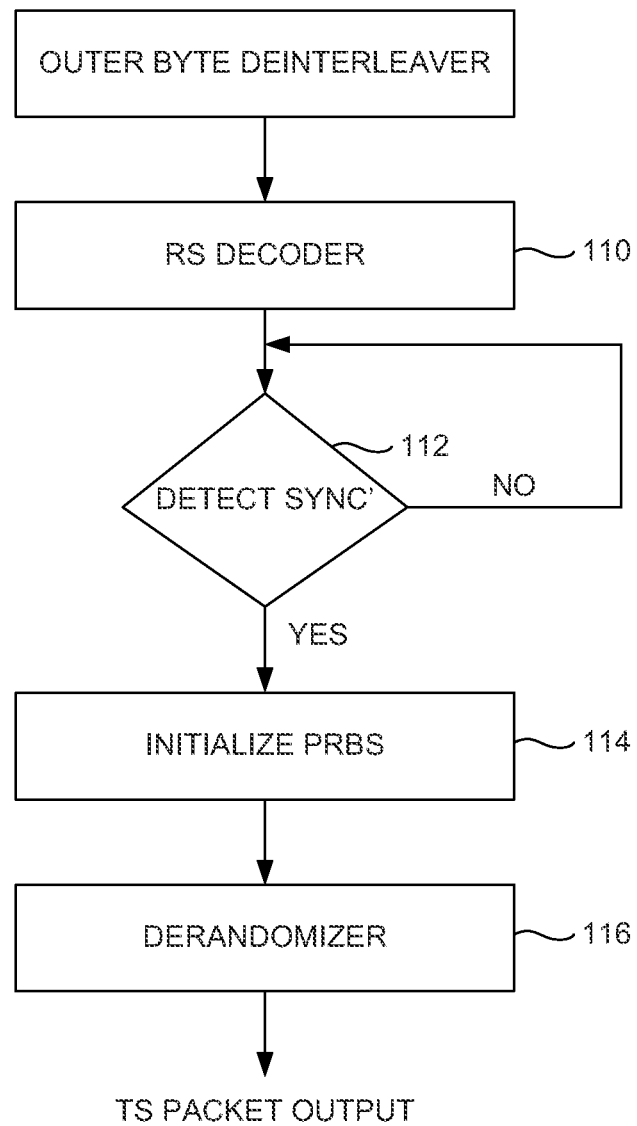
FIG. 1B is a flowchart illustrating a method of Synchronising at a De-randomiser.
Figure 2A:
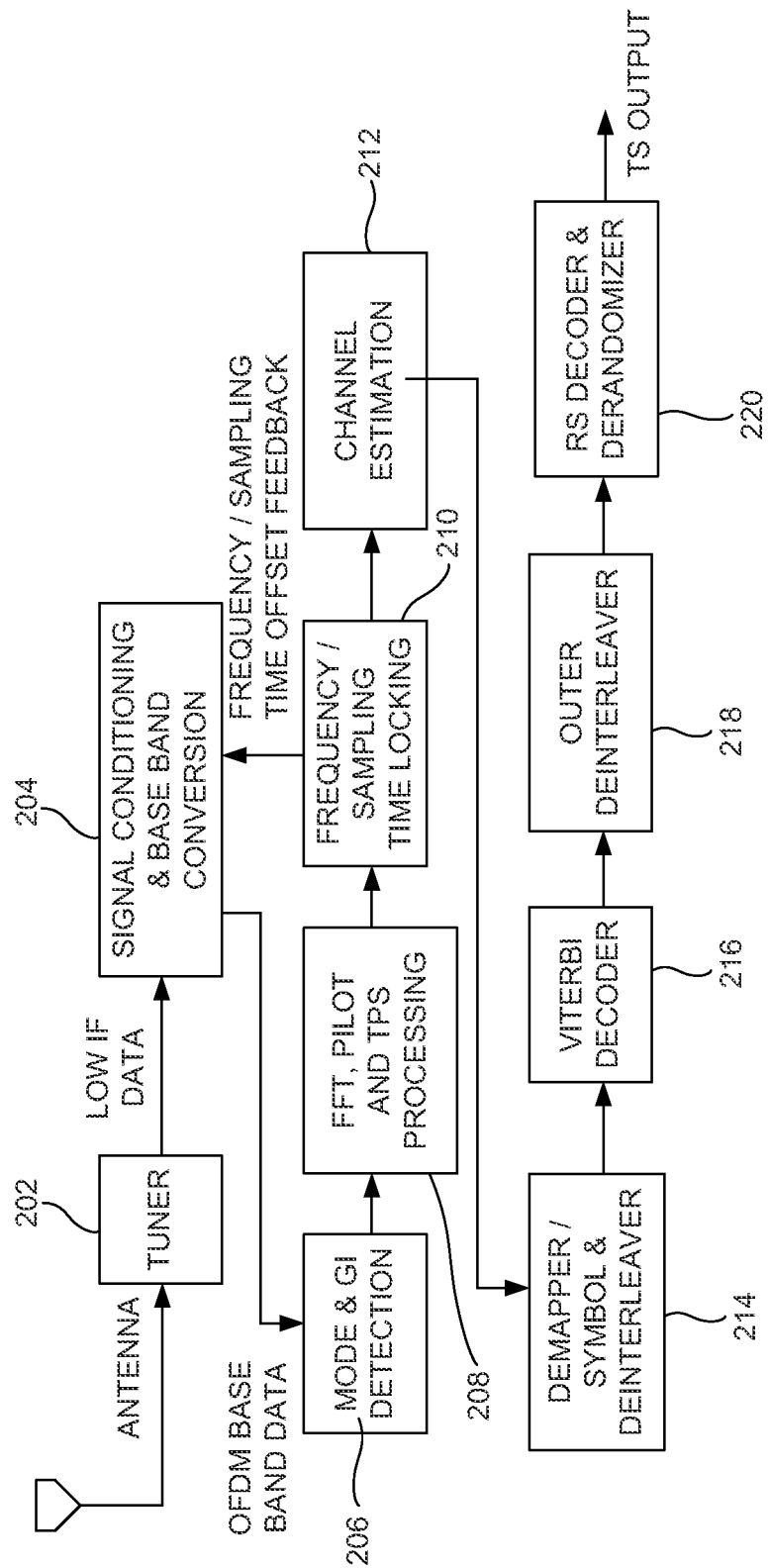
FIG. 2A illustrates a block diagram of a typical DVB-T/H demodulator system.
Figure 2B:
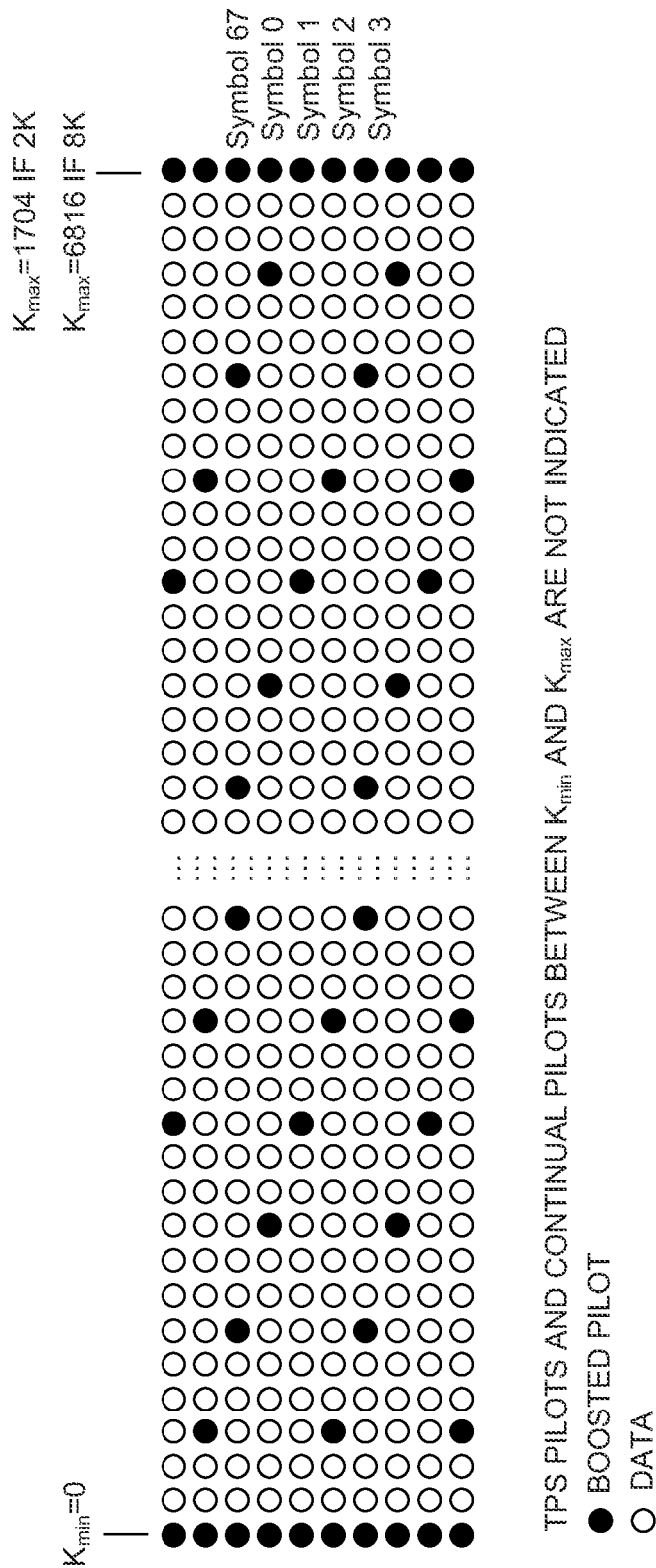
FIG. 2B illustrates a plurality of Scattered Pilots (SP) used for Even/Odd Symbol detection.
Figure 2C:
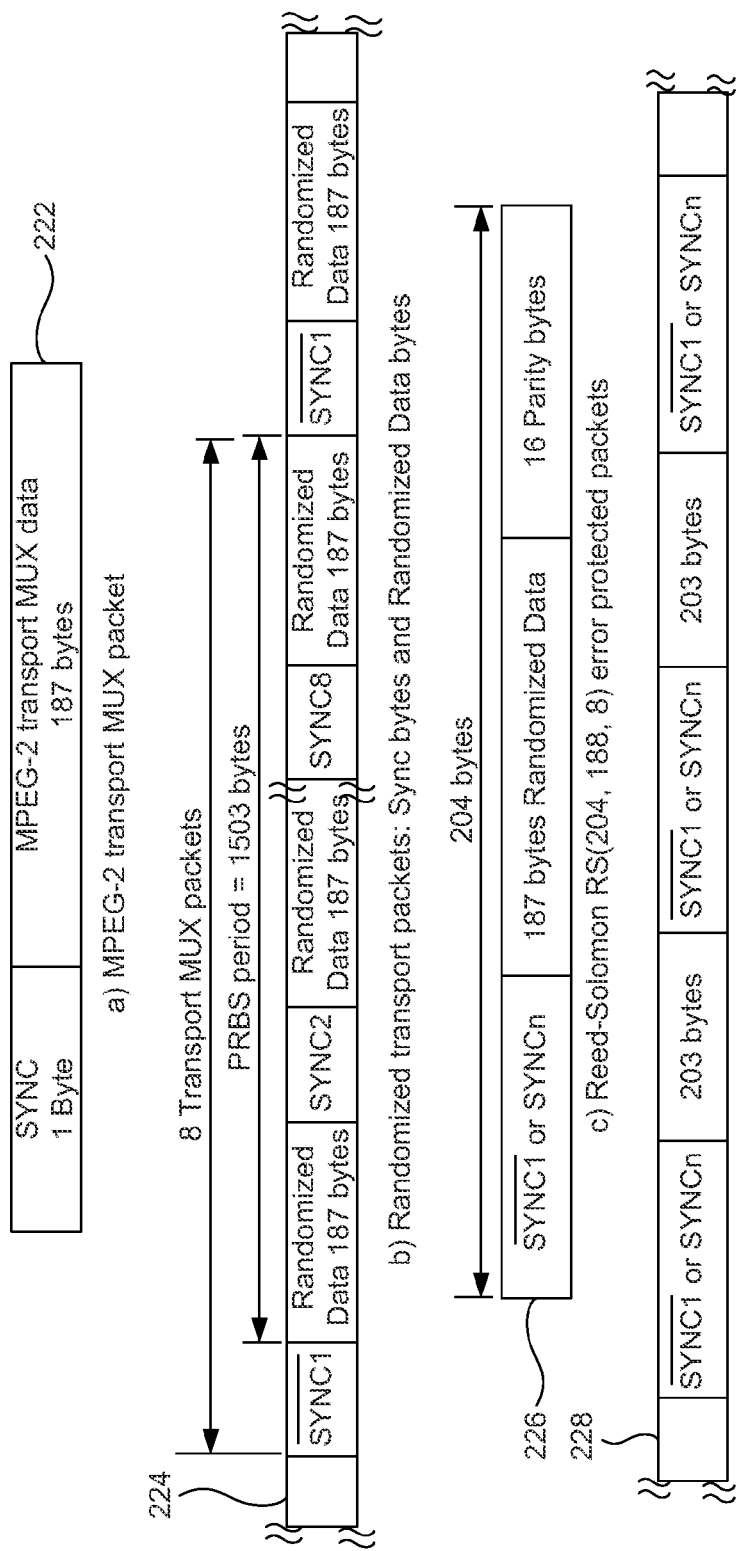
FIG. 2C illustrates a plurality of Reed Solomon Packets with SYNC/SYNC.
Figure 2E:
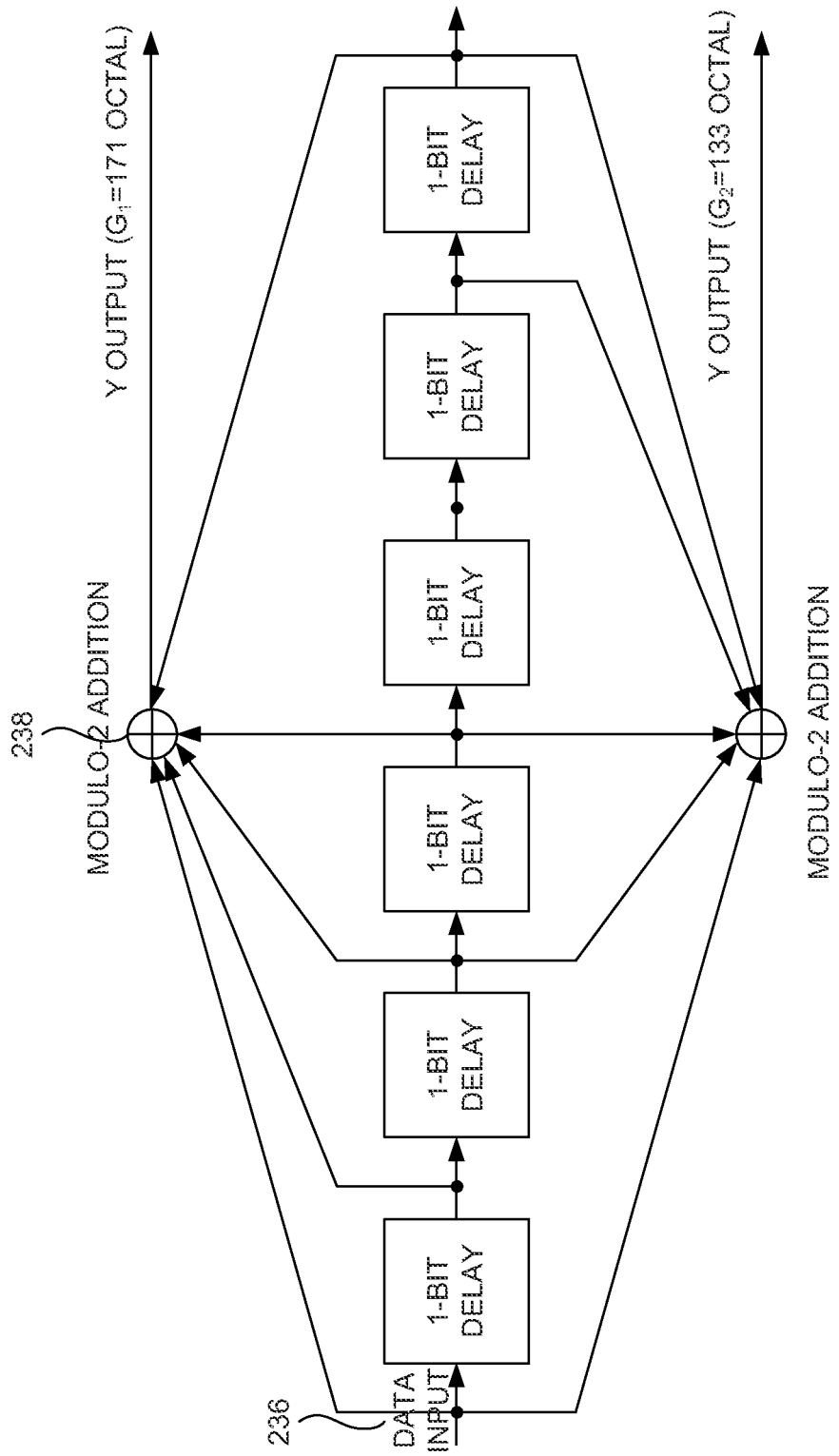
FIG. 2E illustrates convolutional code of rate ½.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for invoking channel decoder early to decrease acquisition time in demodulators. The embodiments herein achieve this by a receiver that detects even and odd OFDM symbols at sub-super frame boundaries. The receiver synchronizes the demodulator (e.g., a DVB-T/H demodulator, or any other demodulator with a different standard) to initialize channel decoder modules on sub-super frame boundaries. This could be either a frame boundary or an OFDM symbol boundary. The receiver detects the even and odd OFDM symbols using the positions of the scattered pilots (SP) for initializing the symbol interleavers (e.g., de-interleaving and bit de-interleaving of the even and odd OFDM symbols) and synchronizes the demodulator at a Viterbi decode input and at a de-randomizer in the receiver. The receiver further detection TS packet boundaries based on an iterative viterbi decode/convolutional encoding process. Further, alignment to TS packet boundary (or the RS packet align boundary) from a frame synchronized boundary by discarding data from bit de-interleaver buffer depending on the one or more channel modulation parameters. Referring now to the drawings, and more particularly to FIGS. 3 through 10, where similar reference characters denote corresponding features consistently throughout the figures, there are shown preferred embodiments.

Figure 3:
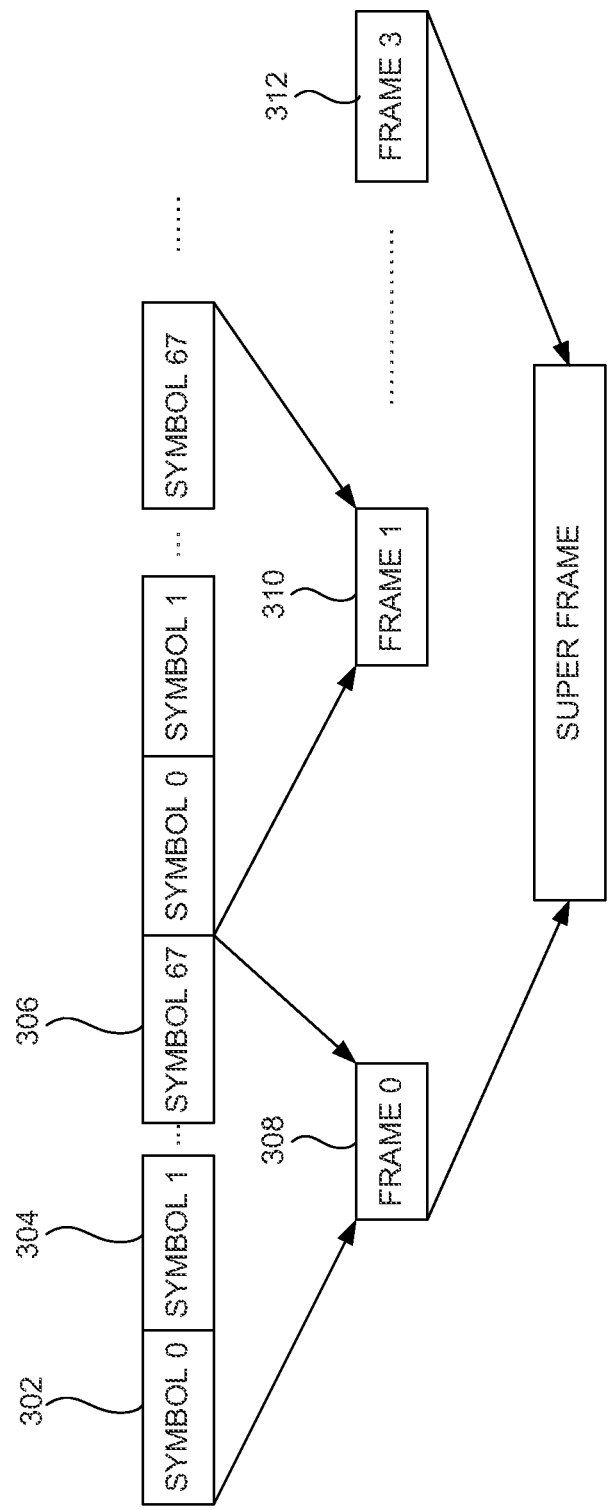
FIG. 3 illustrates a super frame structure for DVB-T/H demodulation according to an embodiment herein.

FIG. 3 illustrates a super frame structure for DVB-T/H demodulation according to an embodiment herein. The super frame structure includes 4 frames from Frame 0 to Frame 3. Each of the four frames further includes 68 symbols ranging from Symbol 0 302, Symbol 304 to Symbol 67 306. Each of the 68 symbols further includes a plurality of data carriers. The number of data carriers within each symbol varies depending on a mode (e.g., a 2K mode, a 8K mode, etc.).

FIG. 4 is a table view illustrating one or more conditions at a super-frame boundary enforced by an encoder on a transmitter side according to an embodiment herein. The table includes modules field 402 and conditions field 404. Conditions of intermediate boundaries or sub-super frame level are derived to invoke early channel decoder. Whenever the sub-super frame or intermediate boundaries conditions are met, a symbol/bit deinterleaver, a Viterbi decoder, an outer de-interleaver, a RS Decode and de-randomiser are started at the sub super frame level/boundaries. Viterbi Decode will initiate if a condition, that MSB of SYNC or SYNC' is input, is satisfied. Symbol Interleaver/De-interleaver initiates on detection of an even symbol. Randomiser or De randomiser initiates when polynomial resets for every 8 TS packets.

To invoke process of early channel decoding, there are two possible conditions. The first condition is Synchronising at a Frame boundary (FIG. 3) when modulation parameters are not known while the second condition is Synchronising at Symbol boundary when modulation parameters are known. The modulation parameters include a Mode, a Guard Interval, a mapping type, and a code rate. Thus the channel decoding can start as early as at a symbol level when these parameters are know. If the parameters are unknown, the channel decoding can start as early as at a Frame level.

Figure 5A:
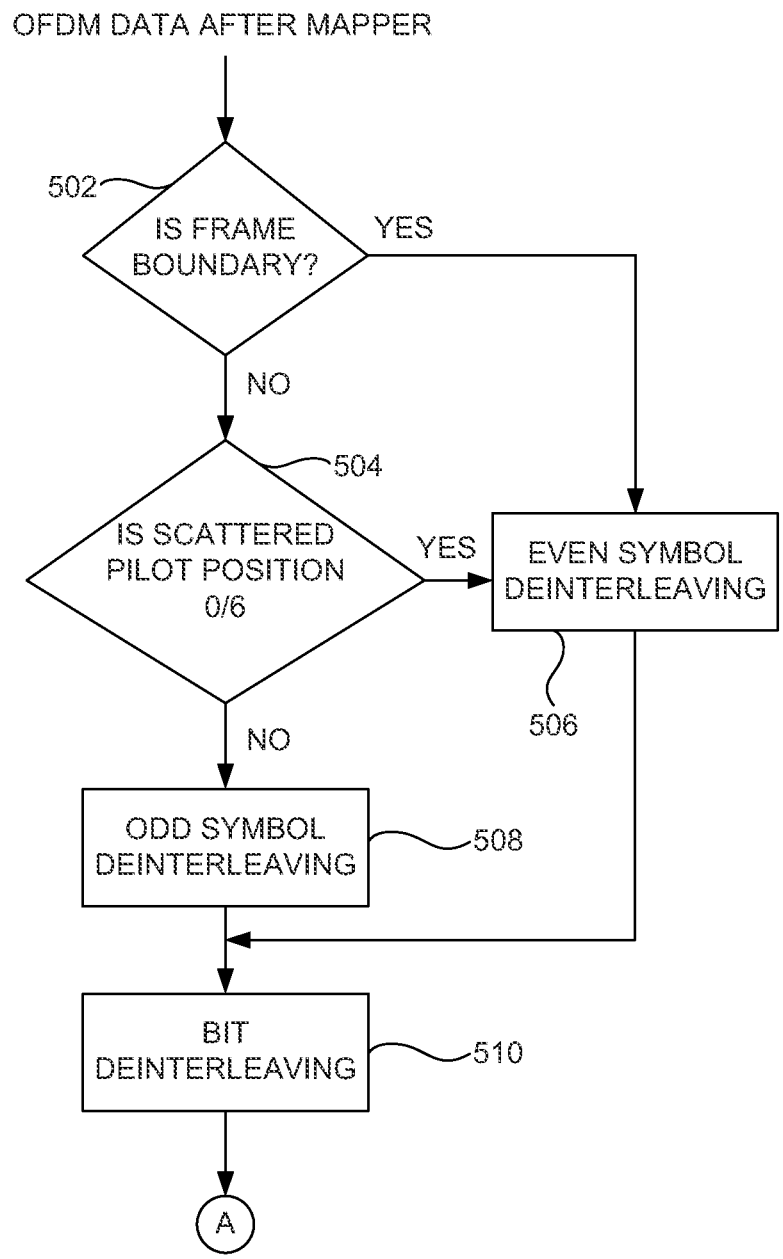
FIG. 5A is a flow diagram illustrating a method of detecting even and odd OFDM symbols from one or more Orthogonal Frequency-Division Multiplexing (OFDM) symbols after processing in a De-mapper of a communication system according to an embodiment herein.

FIG. 5A is a flow diagram illustrating a method of detecting even and odd OFDM symbols from one or more Orthogonal Frequency-Division Multiplexing (OFDM) symbols after processing in a De-mapper of a communication system according to an embodiment herein. In one embodiment, the communication system is a television (TV) receiver. The TV receiver is user to synchronize a demodulator within the receiver by performing a method of bit de-interleaving the even OFDM symbols, and the odd OFDM symbols from the one or more (OFDM) symbols using one or more channel modulation parameters, and effectively reducing channel change times in the TV receiver. In step 502, it is checked whether a frame boundary exists for the OFDM symbols. In one embodiment, the even OFDM symbols, and odd OFDM symbols are detected. If the Frame Boundary is present, the demodulator decodes one or more modulation parameters using Transmission Parameters Signalling (TPS) pilots.

After decoding modulation parameters, the frame boundary holds even OFDM symbols only and the even OFDM symbols are de-interleaved in step 504. In step 506, it is OFDM symbols are checked for its Scattered Pilot positions. In one embodiment, the even OFDM symbols, and the odd OFDM symbols are de-interleaved based on a positions of scattered pilots (e.g., 0/6) when the frame boundary does not exist for the one or more OFDM symbols. In step 508, the ODD OFDM symbols are de-interleaved when there are no scattered pilot positions. In one embodiment, the even OFDM symbols are de-interleaved based on an even position of the scattered pilots in the OFDM signals, and the odd OFDM symbols are de-interleaved based on an odd position of the scattered pilots in the OFDM signals.

In step 510, the even OFDM symbols, and the odd OFDM symbols are bit de-interleaved. The demodulator is synchronized at an OFDM symbol boundary when the channel modulation parameters are known. The channel modulation parameters include (i) a 2K mode or an 8K mode, (ii) a guard interval, (iii) a mapping type, (iv) a code rate of the OFDM symbols, and (v) the positions of the scattered pilots. Thus, the channel change times is reduced by 1/n times of a super frame boundary for the OFDM symbol boundary. 'n' is number of OFDM symbols in the super frame boundary. The channel change times is reduced by 1/p times of the super frame boundary for the frame boundary. 'p' is number of frames in the super frame boundary. In one embodiment, the channel decoder starts at a Frame Boundary since modulation parameters of the channel are unknown. In one embodiment, for the DVB-T/H demodulator, the channel change times is reduced by $\frac{1}{272}$ times of a super frame boundary for the OFDM symbol boundary, and the channel change times is reduced by $\frac{1}{4}$ times of the super frame boundary for the frame boundary.

Figure 5B:
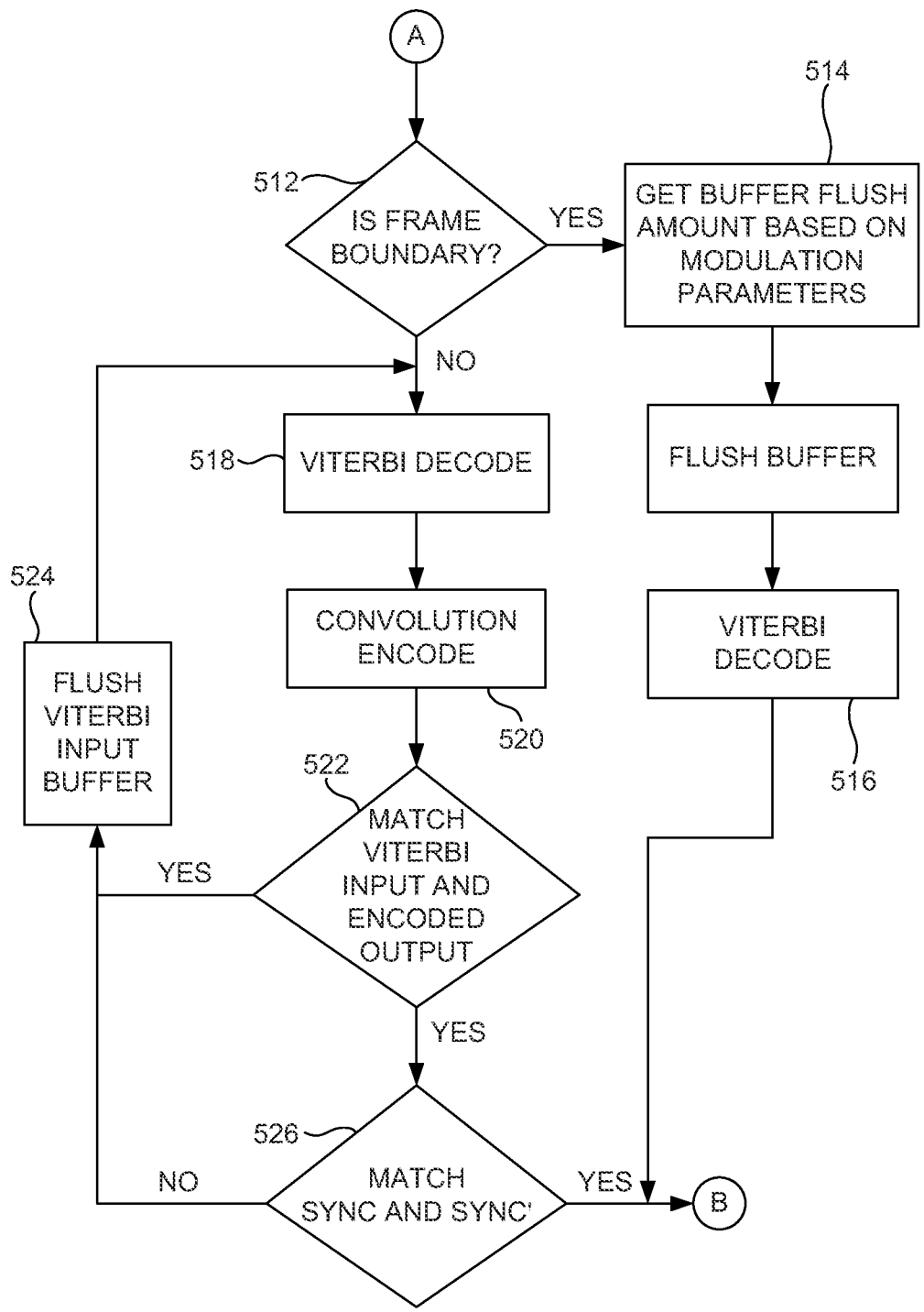
FIG. 5B is a flow diagram illustrating a method of synchronisation at a Viterbi input in the communication system according to an embodiment herein.

With reference to FIG. 5A, FIG. 5B is a flow diagram illustrating a method of synchronisation at a Viterbi input in the communication system according to an embodiment herein. If the channel modulation parameters are known, then synchronisation can be achieved at OFDM symbol boundaries instead of frame boundaries. In step 512, it is checked a frame boundary exists for the OFDM symbols (e.g., the bit de-interleaved even and odd OFDM symbols). If the frame boundary exists for the bit de-interleaved even and odd OFDM symbols, bits from the one or more bit de-interleaved even and odd OFDM symbols are flushed in step 514. In one embodiment, the bits are flushed based on (i) the channel modulation parameters, and (ii) a frame number of the frame boundary. In step 516, a Viterbi decoding is performed on the bits to obtain a RS packet align boundary.

If the frame boundary does not exist, then the Viterbi decoding is performed on the bit de-interleaved even and odd OFDM symbols in step 518. In step 520, a convolutional encoding operation is performed on a decoded data output of the Viterbi decoding. In step 522, it is determined whether an output of the convolutional encoding of the bit de-interleaved OFDM symbols matches an input at a Viterbi decode. If the output of the convolutional encoding of the bit de-interleaved OFDM symbols does not match the input at the Viterbi decode, then the one or more bits are flushed from the bit de-interleaved even and odd OFDM symbols in step 524, and the step 518 is repeated until the output of the convolutional encoding of the bit de-interleaved OFDM symbols matches the input at the Viterbi decode.

If the output of the convolutional encoding of the bit de-interleaved OFDM symbols matches the input at the Viterbi decode, then it is checked whether, the output of the convolutional encoding of the bit de-interleaved even and odd OFDM symbols matches with a SYNC pattern and/or a SYNC' pattern in step 526. If the output of the convolutional encoding of the bit de-interleaved even and odd OFDM symbols does not match with the SYNC pattern and/or the SYNC' pattern, the step 524 is repeated and the step 518 is continued until the output of the convolutional encoding of the bit de-interleaved even and odd OFDM symbols matches with the SYNC pattern and/or the SYNC' pattern. If the output of the convolutional encoding of the bit de-interleaved even and odd OFDM symbols matches with the SYNC pattern and/or the SYNC' pattern), the RS packet align boundary is obtained in step 526. To detect the TS packet alignment, the SYNC/SYNC' pattern is searched by first performing a convolutional encode of the bit de-interleaved even and odd OFDM symbols in the step 522.

Figure 5C:
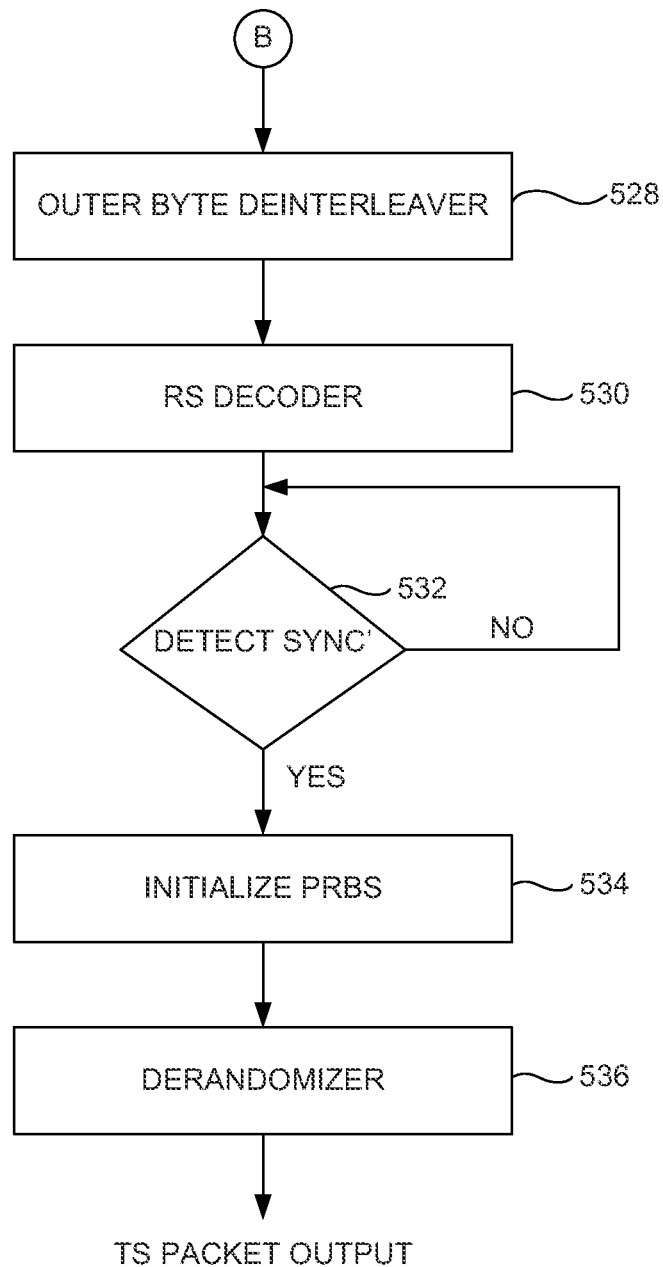
FIG. 5C is a flow diagram illustrating a method of synchronizing a demodulator at a de-randomizer in the receiver for the one or more Orthogonal Frequency Division Multiplexing (OFDM) symbols according to an embodiment herein.

With reference to FIG. 5A and FIG. 5B, FIG. 5C is a flow diagram illustrating a method of synchronizing a demodulator at a de-randomizer in the receiver for the one or more Orthogonal Frequency Division Multiplexing (OFDM) symbols according to an embodiment herein. The output (e.g., RS packet align boundary) from the step 526 is received. In step 528, data from the RS packet align boundary is rearrange and aligned on a outer byte de-interleaver based on a match of the output of the convolutional encoding of the bit de-interleaved OFDM symbols with the SYNC pattern or the SYNC' pattern. In one embodiment, the data is rearranged and aligned for an error correction in a Reed Solomon (RS) decoder in step 530. In step 532, the SYNC' pattern is detected. In step 534, a pseudo-random binary sequence (PRBS) is initialized, and the output received from the step 534 is de-randomized in step 536 to obtain a de-randomized TS packet.

Figure 6A:
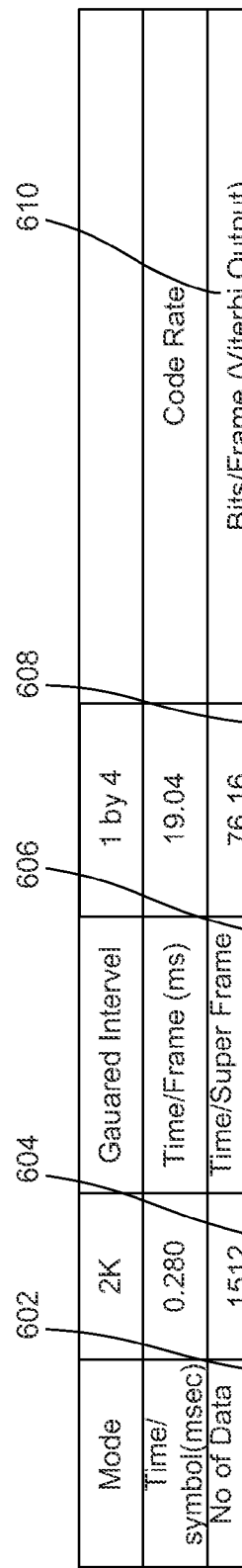
FIG. 6A is a table view illustrating a 2K Mode TS packets/Frame information according to an embodiment herein.

FIG. 6A and FIG. 6B is a table view illustrating a 2K Mode and an 8K Mode TS packets/Frame information according to an embodiment herein. In particular, FIG. 6A is a table view illustrating a 2K Mode TS packets/Frame information according to an embodiment herein. In particular, FIG. 6B is a table view illustrating a 8K Mode TS packets/Frame information according to an embodiment herein. The table view of FIG. 6A and FIG. 6B includes a mapping standard information field 602, a bits/sample information field 604, a bits/symbol information field 606, a symbols/frame information field 608, and a bits/frame (Viterbi output) information field 610. In the 2K Mode, for a QPSK mapping standard, there are 2 bits/sample, each sample has 3024 bits/symbol and 68 symbols constitute a frame. Typically, a Viterbi decoder decodes 102816 bits per frame at code rate $\frac{1}{2}$ to change a channel. In one embodiment, there are only 63 RS packet per frame at the code rate $\frac{1}{2}$ enabling faster channel change times.

Similarly, in the 8K Mode, for a QPSK mapping standard, there are 2 bits/sample, each sample has 12096 bits/symbol and 68 symbols constitute a frame. Typically, a Viterbi decoder decodes 411264 bits per frame to change a channel at code rate $\frac{1}{2}$. In one embodiment, there are only 756 RS packet per frame at code rate $\frac{1}{2}$ which enables faster channel change.

FIG. 7 is a table view illustrating a number of bits to flush at the Viterbi input to sync at SYNC/SYNC' in the 2K mode and the 8K Mode in various demodulation standards according to an embodiment herein. The table view includes a code rate field 702, a QPSK field 704, a 16QAM field 706, and a 64 QAM field 708. In the 2K mode, the number of bits to flush at Frame 1, 2, and 3 for the QPSK mapping standard is 0, 0 and 0 respectively at code rate $\frac{1}{2}$ but increases to 1224, 816 and 408 respectively at code rate 7/8 as shown. In the 8K Mode, the number of bits to flush at Frame 1, 2 and 3 of QPSK, 16QAM and 64 QAM mapping are 0 at all code rates as shown.

Figure 8:
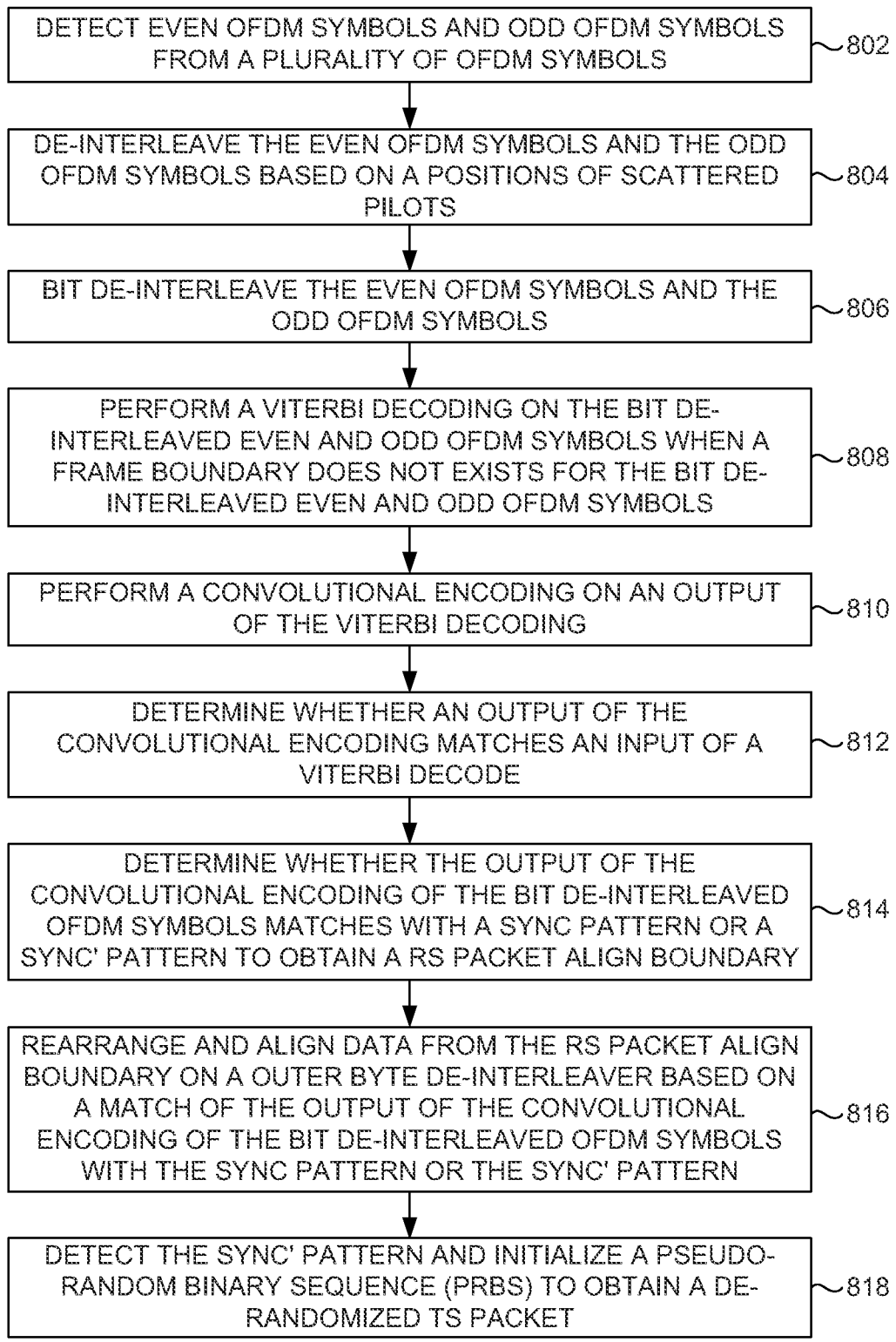
FIG. 8 is a flow diagram illustrating a method synchronizing a demodulator at a de-randomizer in a television (TV) receiver for the one or more Orthogonal Frequency Division Multiplexing (OFDM) symbols, and decreasing channel acquisition times in the demodulator based on channel modulation parameters according to an embodiment herein.

FIG. 8 is a flow diagram illustrating a method synchronizing a demodulator at a de-randomizer in a television (TV) receiver for the one or more Orthogonal Frequency Division Multiplexing (OFDM) symbols, and decreasing channel acquisition times in the demodulator based on channel modulation parameters according to an embodiment herein. In step 802, even OFDM symbols, and odd OFDM symbols are detected from the one or more OFDM symbols. In step 804, the even OFDM symbols, and the odd OFDM symbols are de-interleaved based on a positions of scattered pilots. In step 806, the even OFDM symbols, and the odd OFDM symbols are bit de-interleaved. In step 808, Viterbi decoding is performed on the bit de-interleaved even and odd OFDM symbols when a frame boundary does not exists for the bit de-interleaved even and odd OFDM symbols.

In step 810, a convolutional encoding is performed on an output of the Viterbi decoding. In step 812, it is determined whether an output of the convolutional encoding matches an input of a Viterbi decode. In step 814, the output of the convolutional encoding of the bit de-interleaved OFDM symbols is matched with a SYNC pattern or a SYNC' pattern to obtain a RS packet align boundary. In step 816, data from the RS packet align boundary are re-arranged and aligned on a outer byte de-interleaver when the output of the convolutional encoding of the bit de-interleaved OFDM symbols matches with the SYNC pattern and/or the SYNC' pattern. In one embodiment, the data is re-arranged and aligned for an error correction in a Reed Solomon (RS) decoder. In step 818, the SYNC' pattern is detected, and a pseudo-random binary sequence (PRBS) is initialized to obtain a de-randomized TS packet.

Figure 9:
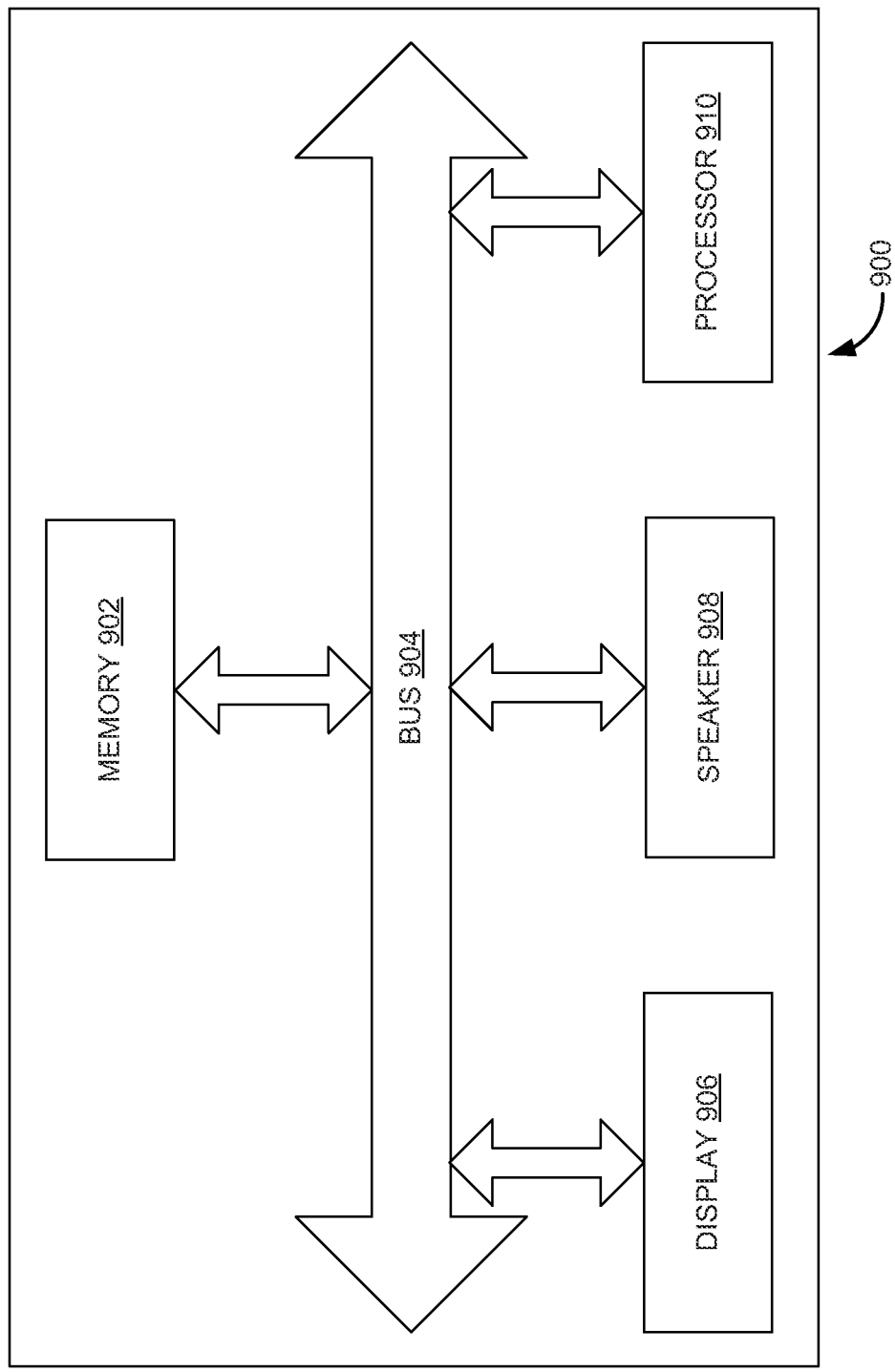
FIG. 9 illustrates an exploded view of a receiver including a memory having a set of computer instructions, a bus, a display, a speaker, and a processor capable of processing the set of computer instructions to perform any one or more of the methodologies herein, according to an embodiment herein.

FIG. 9 illustrates an exploded view of a receiver 900 including a memory 902 having a set of computer instructions, a bus 904, a display 906, a speaker 908, and a processor 910 capable of processing the set of computer instructions to perform any one or more of the methodologies herein, according to an embodiment herein. In one embodiment, the receiver 900 is the same TV receiver as described above which synchronizes a demodulator at a de-randomizer in the television (TV) receiver for the one or more Orthogonal Frequency Division Multiplexing (OFDM) symbols, and decreases channel acquisition times in the demodulator based on channel modulation parameters.

The processor 910 may also enable digital content to be consumed in the form of video for output via one or more displays 906 or audio for output via speaker and/or earphones 908. The processor 910 may also carry out the methods described herein and in accordance with the embodiments herein. Digital content may also be stored in the memory 902 for future processing or consumption. The memory 902 may also store program specific information and/or service information (PSI/SI), including information about digital content (e.g., the detected information bits) available in the future or stored from the past.

A user of the receiver may view this stored information on display 906 and select an item for viewing, listening, or other uses via input, which may take the form of keypad, scroll, or other input device(s) or combinations thereof. When digital content is selected, the processor 910 may pass information. The content and PSI/SI may be passed among functions within the receiver 900 using bus 904. The receiver 900 may be any type of receiver.

The receiver 900 includes a tuner, a demodulator, a processor (e.g., the processor 910 of FIG. 9). The receiver synchronizes the demodulator (e.g., a DVB-T/H demodulator, or any other demodulator with a different standard) to initialize channel decoder modules on sub-super frame boundaries. This could be either a frame boundary or an OFDM symbol boundary. The receiver further detects even and odd OFDM symbols using the positions of the scattered pilots (SP) for initializing the symbol interleavers (e.g., de-interleaving and bit de-interleaving of the even and odd OFDM symbols) and synchronizes the demodulator at a Viterbi decode input and at a de-randomizer in the receiver. The receiver further detection TS packet boundaries based on an iterative viterbi decode/convolutional encoding process (the steps 518-526 of FIG. 5A through FIG. 5C). Further, alignment to TS packet boundary from a frame synchronized boundary by discarding data from bit de-interleaver buffer depending on the one or more channel modulation parameters.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A television (TV) receiver to synchronize a demodulator in said TV receiver by performing a method of bit de-interleaving even Orthogonal Frequency Division Multiplexing (OFDM) symbols, and odd OFDM symbols from a plurality of OFDM symbols using one or more channel modulation parameters, and effectively reducing channel change times in said TV receiver, said method comprising:
(i) detecting said even OFDM symbols and said odd OFDM symbols from said plurality of OFDM symbols;
(ii) de-interleaving said even OFDM symbols and said odd OFDM symbols based on a positions of scattered pilots when a frame boundary does not exist for said plurality of OFDM symbols; and
(iii) bit de-interleaving said even OFDM symbols and said odd OFDM symbols,
wherein said channel change times is reduced by 1/n times of a super frame boundary for an OFDM symbol boundary, wherein n is number of OFDM symbols in said super frame boundary, wherein said channel change times is reduced by 1/p times of said super frame boundary for said frame boundary, wherein p is number of frames in said super frame boundary.

2. The TV receiver of claim 1, wherein said even OFDM symbols are de-interleaved based on an even position of said scattered pilots in OFDM signals, wherein said odd OFDM symbols are de-interleaved based on an odd position of said scattered pilots in said OFDM signals.

3. The TV receiver of claim 1, wherein said demodulator is synchronized at said OFDM symbol boundary when said one or more channel modulation parameters are known, wherein said one or more channel modulation parameters comprises a 2K mode or an 8K mode, a guard interval, a mapping standard, a code rate of said OFDM symbols, and said positions of said scattered pilots.

4. A Television (TV) receiver to perform a method of synchronizing a demodulator at a Viterbi decode input in said TV receiver using a plurality of bit de-interleaved even and odd Orthogonal Frequency Division Multiplexing (OFDM) symbols, and decrease channel acquisition times in said demodulator based on one or more channel modulation parameters, said method comprising:
(i) performing a Viterbi decoding on said bit de-interleaved even and odd OFDM symbols when a frame boundary does not exist for said bit de-interleaved even and odd OFDM symbols;
(ii) performing a convolutional encoding on an decoded data output of said Viterbi decoding;
(iii) determining whether an output of said convolutional encoding of said bit de-interleaved OFDM symbols matches an input at a Viterbi decode; and
(iv) determining whether said output of said convolutional encoding of said bit de-interleaved even and odd OFDM symbols matches with a SYNC pattern or a SYNC' pattern to obtain a RS packet align boundary.

5. The TV receiver of claim 4, wherein said method further comprising:

(i) flushing a plurality of bits from said bit de-interleaved even and odd OFDM symbols when said output of said convolutional encoding does not match said Viterbi decode input; and (ii) performing said Viterbi decoding on said bit de-interleaved even and odd OFDM symbols.

6. The TV receiver of claim 5, wherein said method further comprising: (i) flushing said plurality of bits from said bit de-interleaved even and odd OFDM symbols when said output of said convolutional encoding does not match said SYNC pattern or said SYNC' pattern; and (ii) performing said Viterbi decoding on said bit de-interleaved even and odd OFDM symbols.

7. The TV receiver of claim 4, wherein said method further comprising:

(i) flushing a plurality of bits from said bit de-interleaved even and odd OFDM symbols when said frame boundary exists for said bit de-interleaved even and odd OFDM symbols, wherein said plurality of bits are flushed based on said one or more channel modulation parameters, and a frame number of said frame boundary; and (ii) performing said Viterbi decoding on said plurality of bits to obtain said RS packet align boundary.

8. A method of synchronizing a demodulator at a de-randomizer in a television (TV) receiver for a plurality of Orthogonal Frequency Division Multiplexing (OFDM) symbols, and decreasing channel acquisition times in said demodulator based on channel modulation parameters, said method comprising:

(i) detecting even OFDM symbols and odd OFDM symbols from said plurality of OFDM symbols;

(ii) de-interleaving said even OFDM symbols and said odd OFDM symbols based on a positions of scattered pilots;

(iii) bit de-interleaving said even OFDM symbols and said odd OFDM symbols;

(iv) performing a Viterbi decoding on said bit de-interleaved even and odd OFDM symbols when a frame boundary does not exists for said bit de-interleaved even and odd OFDM symbols;

(v) performing a convolutional encoding on an output of said Viterbi decoding;

(vi) determining whether said output of said convolutional encoding matches an input of a Viterbi decode; and (vii) determining whether said output of said convolutional encoding of said bit de-interleaved OFDM symbols matches a SYNC pattern or a SYNC' pattern to obtain a RS packet align boundary.

9. The method of claim 8, further comprising:

(i) rearranging and aligning data from said RS packet align boundary on a outer byte de-interleaver based on a match of said output of said convolutional encoding of said bit de-interleaved even and odd OFDM symbols with said SYNC pattern or said SYNC' pattern, wherein said data is rearranged and aligned for an error correction in a Reed Solomon (RS) decoder; and (ii) detecting said SYNC' pattern, and initializing a pseudo-random binary sequence (PRBS) to obtain a de-randomized TS packet.

* * * * *